(12) United States Patent
Oyamada

(10) Patent No.: US 6,256,055 B1
(45) Date of Patent: Jul. 3, 2001

(54) ELECTROPHOTOGRAPHIC PRINTER

(75) Inventor: Satoru Oyamada, Niigata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/304,667

(22) Filed: May 4, 1999

(30) Foreign Application Priority Data

May 8, 1998 (JP) .................................................. 10-125987

(51) Int. Cl.[7] .................................................. B41J 2/435
(52) U.S. Cl. ............................ 347/248; 347/116; 347/229
(58) Field of Search ................................... 347/137, 234, 347/235, 248, 250, 229, 116, 117; 399/162, 165

(56) References Cited

U.S. PATENT DOCUMENTS 5,257,047 * 10/1993 Haneda et al. ........................ 347/137
5,905,519 * 5/1999 Brenner, Jr. et al. ................. 347/116

FOREIGN PATENT DOCUMENTS

| 4-9975 | * | 4/1992 | (JP) | ................................ G03G/15/04 |
| 4-181276 | * | 6/1992 | (JP) . | |
| 4-251874 | | 9/1992 | (JP) . | |
| 4-275574 | | 10/1992 | (JP) . | |
| 5-297953 | | 11/1993 | (JP) . | |
| 6-83127 | | 3/1994 | (JP) . | |

* cited by examiner

Primary Examiner—N. Le
Assistant Examiner—Hai C. Pham
(74) Attorney, Agent, or Firm—Foley & Lardner

(57) ABSTRACT

An object is to make it possible to compensate a forming position of an electrostatic latent image just after detection of a position of a photosensitive belt. A position control section has a timing compensating function to compensate output timing of an image signal to be outputted when the n+2-th line is scanned, on the basis of a difference between a position $C_n$ of the photosensitive belt outputted from a position sensor section when the n-th line of the electrostatic latent image is scanned and a position $C_{n+1}$ of the photosensitive belt outputted from the position sensor section when the n+1-th line is scanned.

10 Claims, 9 Drawing Sheets

ELECTROPHOTOGRAPHIC PRINTER

BACKGROUND OF THE INVENTION

1. Field of the Invention

The present invention relates to an electrophotographic printer, and more particularly, it relates to an electrophotographic printer which forms an electrostatic latent image on a photosensitive belt.

2. Description of the Prior Art

In this type of the electrophotographic printer, the position of a photosensitive belt shifts in the width direction of the belt according to the rotation of the photosensitive belt, and therefore, previously, steering control has been performed to compensate this shift. The steering control means such a control that a positional shift of the photosensitive belt is detected and inclination of a roller to rotate the belt is changed according to a shifting amount and the belt is set at a fixed position.

A conventional example is shown in FIG. 9. In FIG. 9(a), a photosensitive belt 51 is hung over a roller 52 with a proper tension. Here, there are a plurality of rollers over which the belt 51 is hung, but part of them are omitted in the figure. Near the photosensitive belt 51, a laser output section 53 is provided. This laser output section 53 has a function to radiate a laser beam on the surface of the belt 51 and to make this laser beam scan in the width direction of the belt 51. This laser beam scanned by the laser output section 53 is not only radiated on the surface of the belt 51, but also radiated on positions apart from the belt 51 at the edge of the scanning range thereof. This laser beam slipping off the belt 51 forms a light spot on a mask 54 according to the scanning position. This mask 54 is provided opposite to the laser output section 53 through the belt 51. Furthermore, the positioning of each component is made so that the state may gradually change among a state where this laser beam does not come in both the belt 51 and the mask 54, a state where the laser beam comes in only the mask 54, a state where the laser beam comes in both the belt 51 and the mask 54, and a state where the laser beam comes in only the belt 51 in the course of scanning of the laser beam when the belt 51 is arranged in a normal position.

This state will be described referring to FIG. 9(b). FIG. 9(b) is a figure in which the belt 51 and the mask 54 are seen from the laser output section 53 side. Now, when the light spot is scanned in the direction of numeral 56a→56b→56c, the light spot does not come in both the belt 51 and the mask 54 in the state of numeral 56a. Next, in the state of numeral 56b, the state becomes a state where the light spot comes in both the belt 51 and the mask 54 through a state where the laser beam comes in only the mask 54. Moreover, in the state of numeral 56c, the state becomes a state where the light spot comes in only the belt 51 but it does not come in the mask 54. Accordingly, when a laser beam is scanned by 1 line, the laser beam comes in the mask 54 only for a short time, and since the scanning speed of the laser beam is constant, time of coming-in changes according to the position of the belt 51. For example, in FIG. 9(b), when the edge of the belt 51 moves from a solid line to a two-dot-chain line as shown by arrows, the time when the laser beam comes in the mask 54 becomes shorter. Therefore, by detecting this light spot coming in the mask 54 by using a photo sensor 55 in FIG. 9(a), the position of the belt 51 can be detected from the time when output of this photo sensor 55 is turned on.

Previously, feedback control of the position in the width direction of the belt 51 has been performed in such a way that a positional shift of the belt 51 is detected by using a position detecting means like this and the roller 52 is inclined according to the shifting amount.

BRIEF SUMMARY OF THE INVENTION

Object of the Invention

However, in the above conventional example, it was difficult to accurately converge the position of the belt 51 onto a fixed position, and in some cases, a minute error arose in position in the width direction of the belt on which an electrostatic latent image was formed. Furthermore, even if the roller 52 was inclined, the position of the belt was not immediately compensated, but it gradually approached to a proper position with the rotation of the belt 51, and therefore, it was impossible to form the electrostatic latent image at a proper position, unless the belt had been rotated several times after the detection of a position of the belt. Accordingly, it was necessary to perform an idle scanning (scanning outputting no image signal) for compensating the position of the belt before the beam scanning for forming an electrostatic latent image.

An object of the present invention is to improve the inconveniences included in such a conventional example, and more particularly, to provide an electrophotographic printer in which the forming position of an electrostatic latent image can be compensated immediately after the detection of the position of a photosensitive belt and furthermore, the electrostatic latent image can be formed at a proper position even in a state where the photosensitive belt is inclined in the width direction.

Summary of the Invention

In order to attain the above object, in the present invention an electrophotographic printer comprises a photosensitive belt on which an electrostatic latent image is formed; a laser output section which scans this photosensitive belt in the width direction to form the electrostatic latent image; and a position sensor section which detects a position in the width direction of the photosensitive belt on the basis of time since a light spot scanned by this laser output section passed a reference position until the light spot passes an edge of the photosensitive belt. Furthermore, it comprises a position control section which controls a forming position of the electrostatic latent image on the photosensitive belt on the basis of a position of the photosensitive belt outputted from this position sensor section and a printer section which develops the electrostatic latent image on a medium and outputs the electrostatic latent image. Then, it employs such a composition that the position control section has a timing compensating function to compensate output timing of the image signal to be outputted when a still more back line is scanned on the basis of a difference between a position of the photosensitive belt which is outputted from the position sensor section when a front line of the electrostatic latent image is scanned and a position of the photosensitive belt which is outputted from the position sensor section when a back line is scanned.

Here, a line to be scanned in advance when forming an electrostatic latent image is called "front line," a line to be scanned after that is called "back line," and a line to be scanned further after that is called "still more back line," and for example, a case where the front line is the n-th line, the back line is the n+1-th line, and the still more back line is the n+2-th line (n=1, 2, 3 . . . ), a case where the front line is the n-th line, the back line is the n+2-th line, and the still more back line is the n+4-th line, and the like are corresponding cases.

In another aspect of the present invention an electrophotographic printer comprises a photosensitive belt on which an electrostatic latent image is formed; four pieces of laser output sections which scan this photosensitive belt in the width direction to form the electrostatic latent image and which respectively correspond to Y, M, C and B; and a position sensor section which detects a position in the width direction of the photosensitive belt for each of Y, M, C, and B on the basis of time since a light spot scanned by these laser output sections passed a reference position until the light spot passes an edge of the photosensitive belt. Furthermore, it comprises a position control section which controls a forming position of the electrostatic latent image on the photosensitive belt on the basis of a position of the photosensitive belt outputted from this position sensor section for each of Y, M, C, and B and a printer section which develops the electrostatic latent image on a medium and outputs the electrostatic latent image for each of Y, M, C, and B. Then, it employs such a composition that the position control section has a timing compensating function to compensate output timing of an image signal to be outputted when a still more back line is scanned for each of Y, M, C and B on the basis of a difference between a position of the photosensitive belt which is outputted from the position sensor section when a front line of the electrostatic latent image is scanned and a position of the photosensitive belt which is outputted from the position sensor section when a back line is scanned.

Here, Y, M, C, and B can mean yellow, magenta, cyan, and black, respectively.

In the present invention an electrophotographic printer employs such a composition that the timing compensating function is a function to compensate an output timing of an image signal to be outputted when the n+2-th line is scanned on the basis of a difference $\Delta C$ between a position Cn outputted from the position sensor section when the n-th line (n=1, 2, 3 . . .) is scanned and a position Cn+1 outputted from the position sensor section when the n+1-th line is scanned.

In the present invention an electrophotographic printer employs such a composition that the timing compensating function is a function to compensate an output timing of an image signal when the n+2-th line is scanned, by $\Delta C$ relative to output timing of an image signal when the n+1-th line is scanned.

In the present invention an electrophotographic printer employs such a composition that the position control section has a trigger function to start an output of the image signal after a fixed time has elapsed since a horizontal synchronizing signal to form an electrostatic latent image changed, and that the timing compensating function is a function to compensate the fixed time since the horizontal synchronizing signal changed until an image signal is outputted.

In the present invention an electrophotographic printer employs such a composition that the position control section has a trigger function to start an output of the image signal after a fixed time has elapsed since a horizontal synchronizing signal to form an electrostatic latent image changed, and that the timing compensating function is a function to compensate timing of change of the horizontal synchronizing signal.

Thereby, it is attempted to attain the above mentioned object.

DETAILED DESCRIPTION OF THE PREFERRED EMBODIMENTS

One embodiment of the present invention will be described below on the basis of FIG. 1 to FIG. 4. With respect to the parts equal to those of the conventional example, the same numerals are denoted, and repeated descriptions are omitted.

Figure 1:
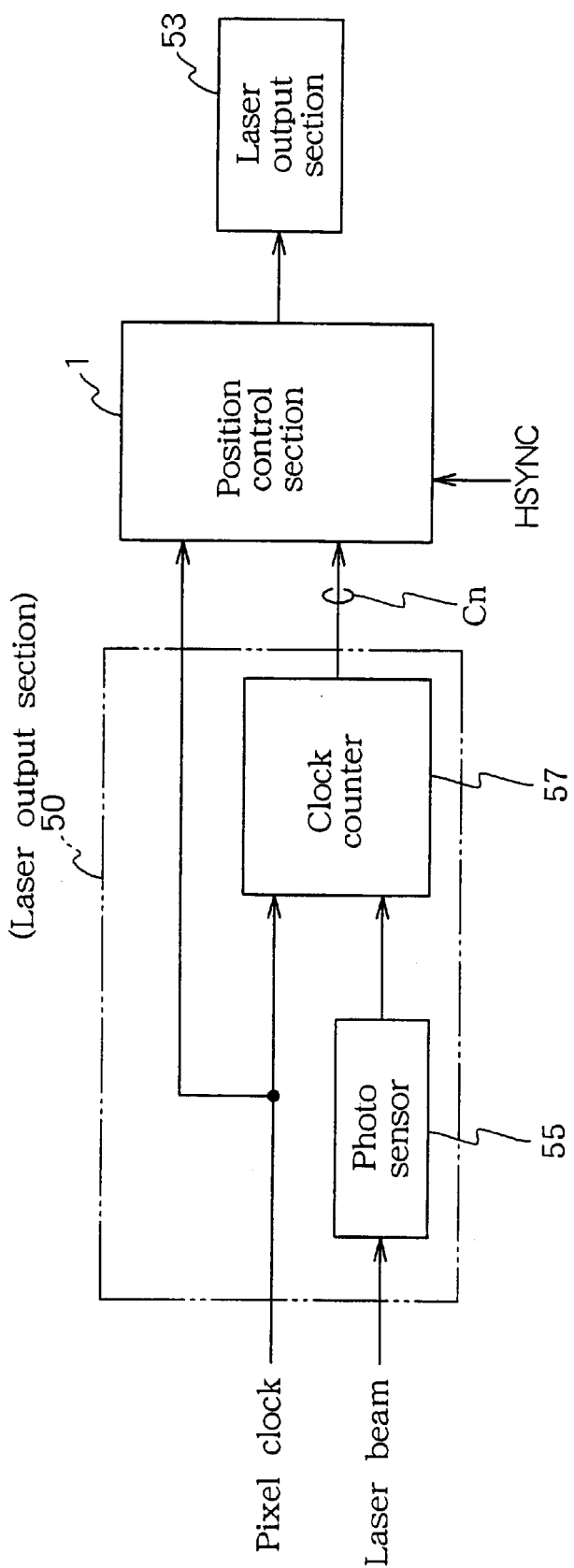
FIG. 1 is a block diagram showing the configuration of the main part in one embodiment of the present invention.
Figure 9A:
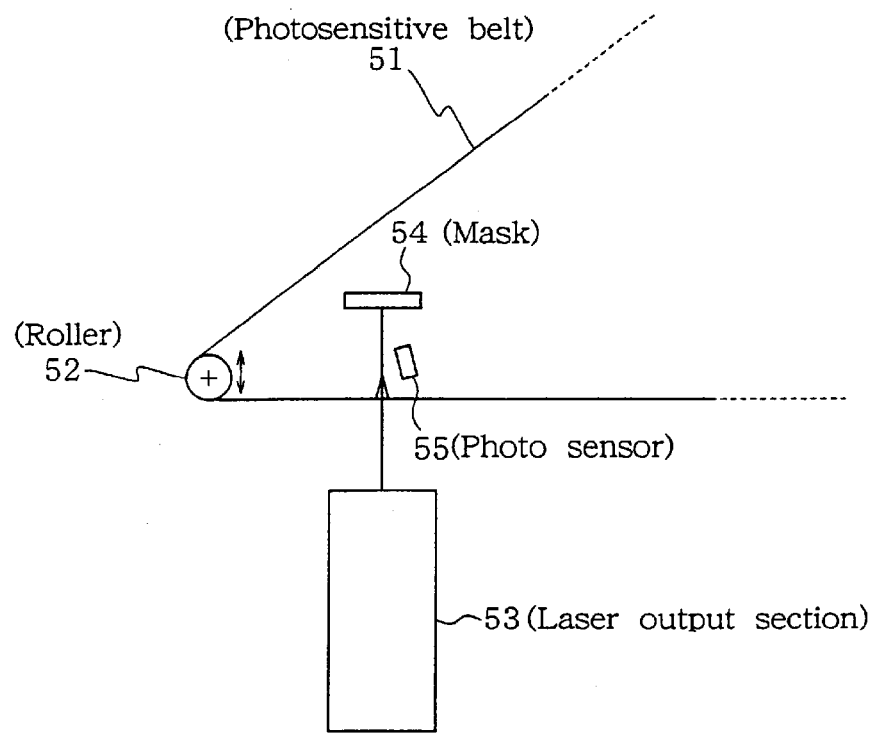
FIG. 9 is an explanation figure of a conventional example, and FIG. 9($a$) is a figure of the configuration of the main part and FIG. 9($b$) is an explanation figure of the operation.
Figure 9B:
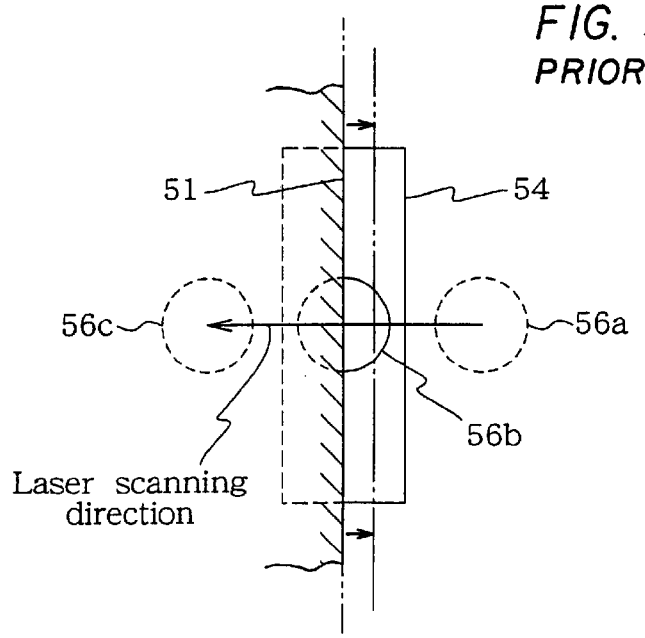

First, the mechanical configuration of an electrophotographic printer is equal to that of the conventional example in FIG. 9, and the electrophotographic printer comprises a photosensitive belt 51 on which an electrostatic latent image is formed and a laser output section 53 which scans this photosensitive belt 51 in the width direction to form an electrostatic latent image. Furthermore, as shown in FIG. 1, it comprises a position sensor section 50 which detects a position in the width direction of the photosensitive belt 51 on the basis of time since a light spot scanned by the laser output section 53 passed a reference position (an edge of a mask 54 in the present embodiment) until the light spot passes an edge of the photosensitive belt 51. Moreover, it comprises a position control section 1 which controls a forming position of the electrostatic latent image on the photosensitive belt 51 on the basis of a position of the photosensitive belt 51 outputted from this position sensor section 50. Furthermore, it comprises a previously general elctrophotographic printer section (omitted in the figure) which develops an electrostatic latent image on a medium and outputs that image.

The position control section 1 has a timing compensating function to compensate an output timing of an image signal to be outputted when a still more back line is scanned on the basis of a difference between a position of the photosensitive belt 51 which is outputted from the position sensor section 50 when a front line of the electrostatic latent image is scanned and a position of the photosensitive belt 51 which is outputted from the position sensor section 50 when a back line is scanned.

In the present embodiment, the timing compensation function is a function to compensate output timing of an image signal to be outputted when the n+2-th line is scanned, on the basis of a difference $\Delta C$ between a position Cn of the photosensitive belt 51 outputted from the position sensor section 50 when the n-th line (n=1, 2, 3 . . . ) is scanned, and a position Cn+1 of the photosensitive belt 51 outputted from the position sensor section 50 when the n+1-th line is scanned, and especially, it is made to compensate output timing of an image signal when the n+2-th line is scanned, by $\Delta C$ relative to output timing of an image signal when the n+1-th line is scanned.

Furthermore, the position control section 1 has a trigger function to start an output of an image signal after a fixed time has elapsed since a horizontal synchronizing signal (hereafter, referred to simply as HSYNC) to form an electrostatic latent image changed. Then, the above timing compensating function is a function to compensate the fixed time since HSYNC changed until an image signal is outputted.

This will be further described in detail. In the present embodiment, the position sensor section 50 inputs an output of a photo sensor 55 and pixel clock to picture an electrostatic latent image, into a clock counter 57, and it counts time when an output of the photo sensor 55 is turned on, by a number of pixel clock. Then, it outputs the counted number as a position of the photosensitive belt 51.

Figure 2:
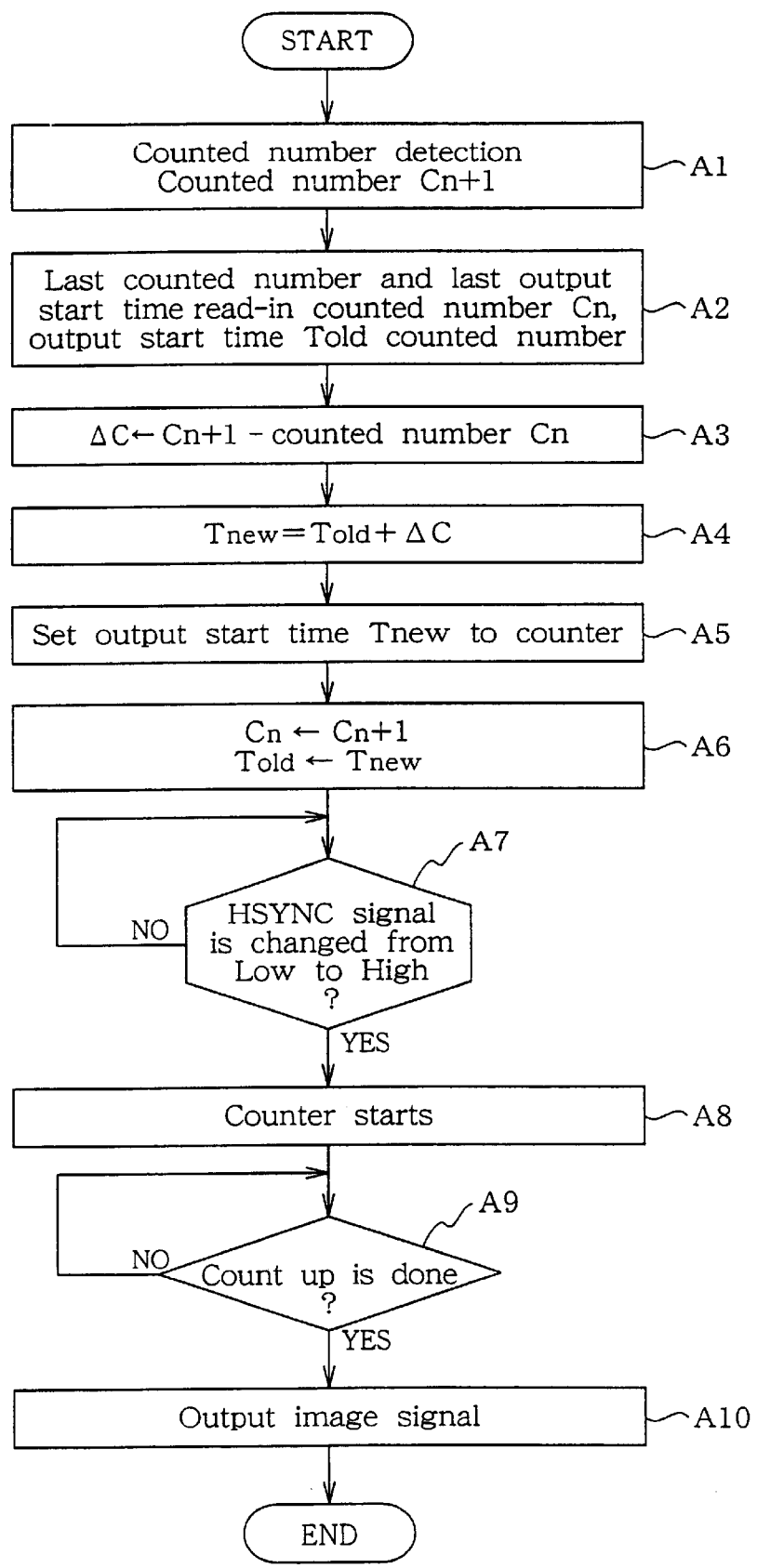
FIG. 2 is a flowchart showing the operation of a position control section in FIG. 1.

Next, the operation of the present embodiment will be described on the basis of FIG. 2.

The position control section 1 sends an image signal corresponding to image data to the laser output section 53, and forms electrostatic latent images from the first line to the final line. An output of an image signal is performed in turn from the first line to the final line, and when a fixed output waiting time has passed after HSYNC signal changing in a cycle of one line changed from Low to High, an image signal of the corresponding line is outputted, and electrostatic latent images for one line are formed. The operation after electrostatic latent images have been formed up to the n-th line will be described below.

When a fixed output waiting time Tnew (=Told) has elapsed after the HSYNC signal changed from Low to High, the position control section 1 sends an image signal to the laser output section 53, and forms an electrostatic latent image according to the scanning of the n+1-th line. At this moment, it obtains the counted number Cn+1 outputted from the position sensor section 50 (A1). Furthermore, it read outs the counted number Cn obtained when the n-th line was last scanned, and the output waiting time Told when the n+1-th line is now scanned (A2) Here, the position control section 1 comprises a memory means for keeping values of the counted number Cn and the output waiting time Told (omitted in the figure). Then, it calculates the counted difference $\Delta C=Cn+1-Cn$ (A3), and employs the value of Told+$\Delta C$ as output waiting time Tnew to be used in the next scanning (A4). When this output waiting time changes, the position of an electrostatic latent image formed on the photosensitive belt 51 shifts in the width direction of the belt.

Thus, when a new output waiting time Tnew has been calculated, this value is set as a target value of the internal counter (A5). In this internal counter (unillustrated) of the position control section 1, addition is performed according to the cycle of the pixel clock. Here, the position control section 1 substitutes the counted number Cn+1 obtained from the position sensor section 50 by the last scanning, in Cn. Furthermore, it substitutes the new output waiting time Tnew in Told (A6). Then, when the HSYNC signal has been changed from Low to High again (A7), it performs reset start of the internal counter (A8). Consequently, in the internal counter, addition is gradually performed according to the cycle of the pixel clock, and the target value Tnew is reached after a fixed time (A9). When the internal counter has reached the target value Tnew, the position control section 1 starts an output of an image signal corresponding to the n+2-th line (A10). By repeating the above operation from the first line to the final line, electrostatic latent images are formed on the photosensitive belt 51. Here, when forming electrostatic latent images of the first line and the second line, idle scanning (scanning outputting no image signal) of two lines in front of the first line is performed, and by using an output counted number of the position sensor section 50 at this moment, the same positional compensation can be performed.

Figure 3:
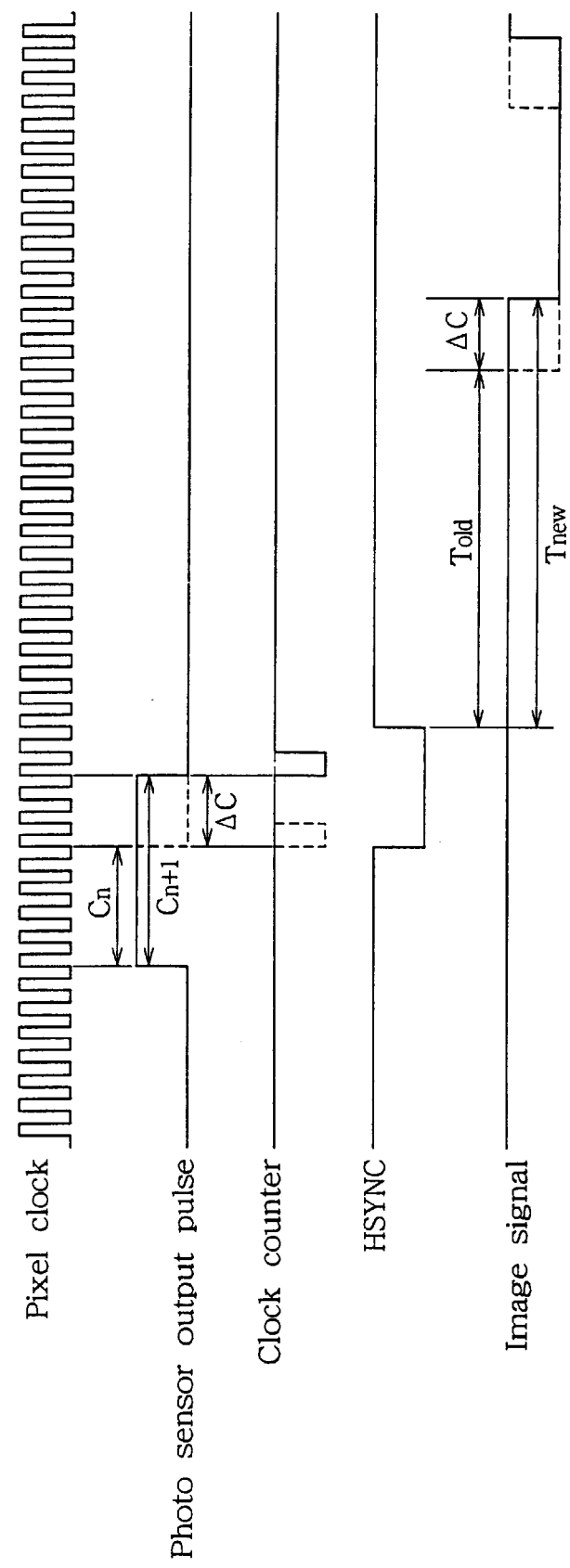
FIG. 3 is a figure of signals for describing the operation of the embodiment in FIG. 1.

The above operation will be described by referring to the figure of signals in FIG. 3. First, when the n-th line is scanned, the output pulse of the photo sensor 55 becomes temporarily on as shown by a dotted line. The width of this pulse reflects the position of the photosensitive belt 51. The time when it takes for an output of the photo sensor 55 to come to off from on is counted by the clock counter 57, and when the output of the photo sensor 55 has become Low, the counted number Cn is inputted into the position control section 1. Next, when line n+1 is scanned, the output pulse of the photo sensor 55 temporarily becomes on as shown by a solid line. Here, if the photo sensitive belt 51 is inclined, for example, Cn+1 with a counted number larger than that of Cn is detected. This difference of the counted number is $\Delta C$. Then, in the case where the output waiting time when the electrostatic latent image of the n+1-th line is formed is Told, the output waiting time to output the image signal of the n+2-th line is compensated to Tnew=Told+$\Delta C$.

Figure 4:
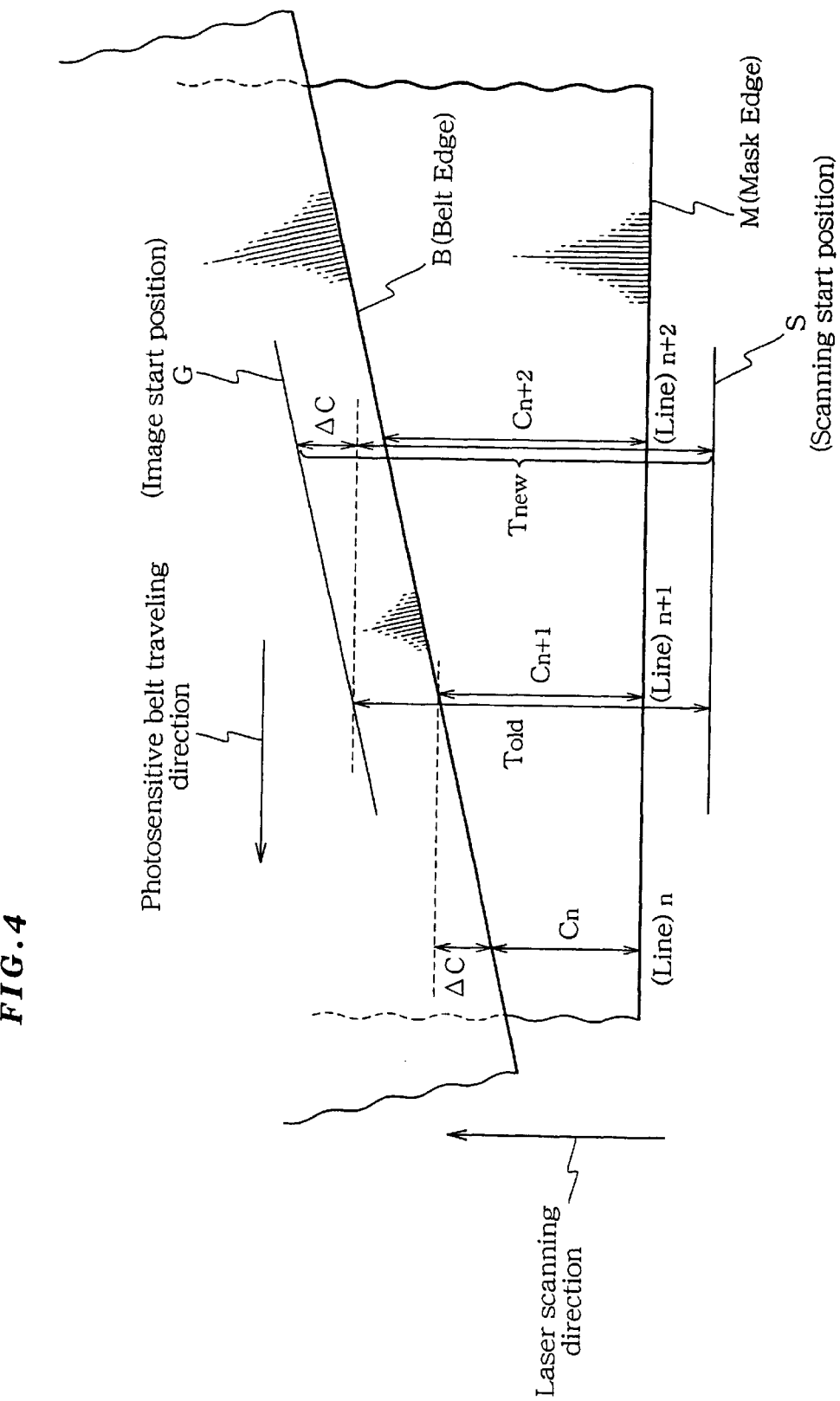
FIG. 4 is a figure of the principle for describing the operation of the embodiment in FIG. 1.

According to this, as shown in FIG. 4, the counted number reflecting distance from an edge M of the mask 54 to an edge B of the belt in the n-th line is Cn, and the counted number in the n+1-th line is Cn+1. At this moment, the start position of the electrostatic latent image in the n+1-th line is shown by Told, and the position of the electrostatic latent image in the n+2-th line is Tnew, that is, Told+$\Delta C$. Therefore, the image start position G is parallel to the edge B of the belt, and even if a positional shift in the width direction has arisen in the belt, the electrostatic latent image can be formed in a correct position on the belt.

Next, another embodiment of the present invention will be described on the basis of FIG. 5 to FIG. 7.

Figure 5:
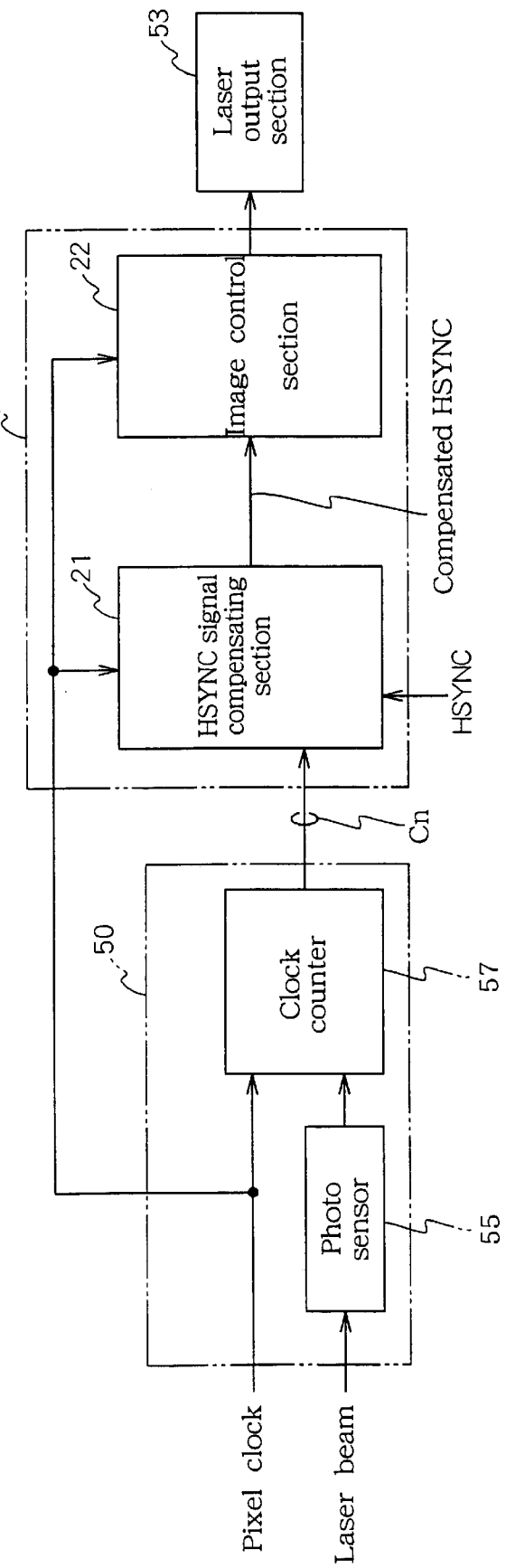
FIG. 5 is a block diagram showing the configuration of the main part in another embodiment of the present invention.
Figure 6:
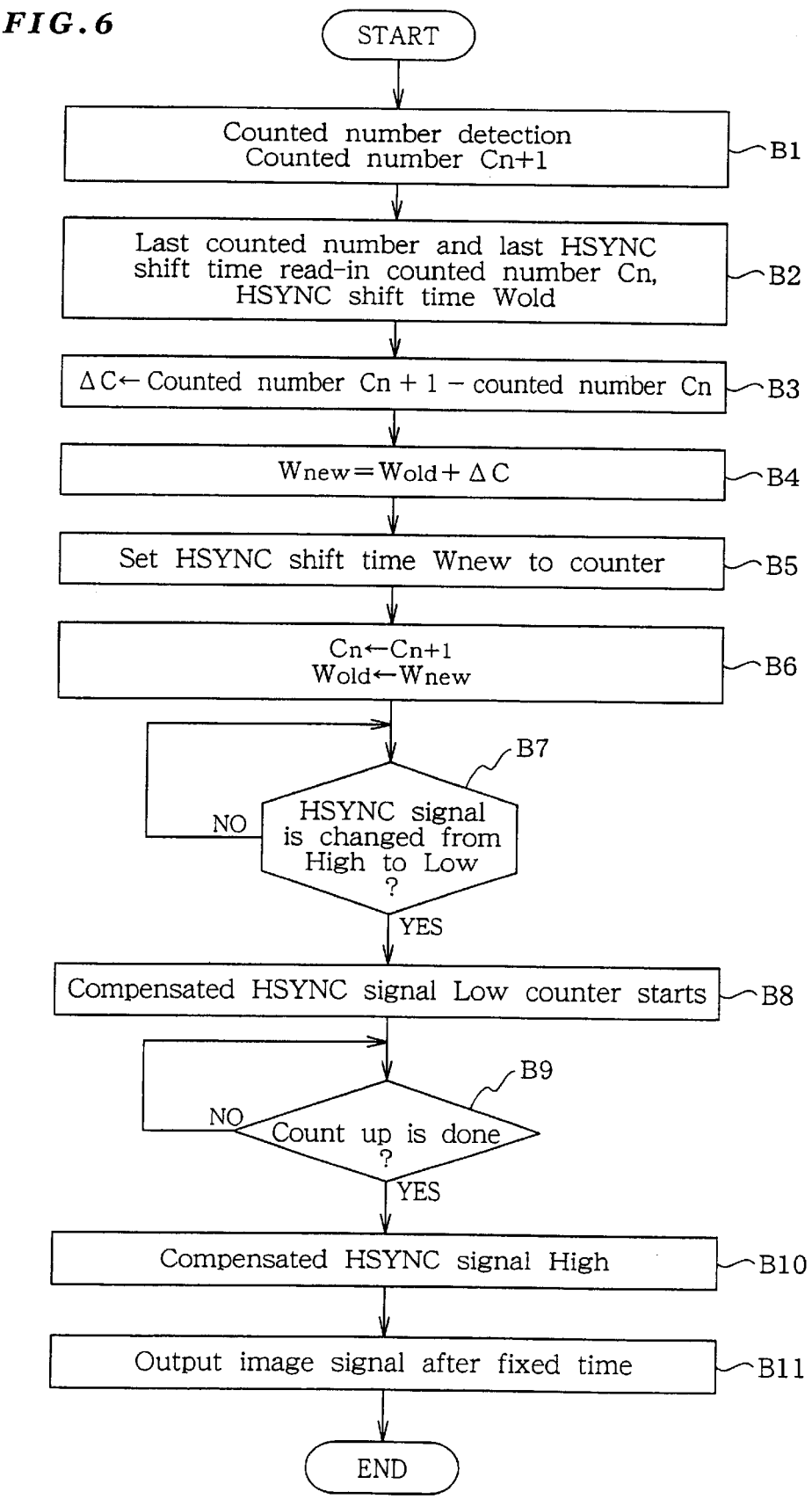
FIG. 6 is a flowchart showing the operation of a position control section in FIG. 5.

In the present embodiment, as shown in FIG. 5, the position control section 2 comprises an HSYNC signal compensating section 21 and an image output section 22. Other components are equal to those in the above embodiment. The HSYNC signal compensating section 21 obtains counted numbers Cn and Cn+1 from an output of the position sensor section 50 similarly to the above embodiment, and finds the difference $\Delta C$. Here, in the above embodiment, the time (output waiting time) since the HSYNC signal became High until an image signal is outputted is compensated by using $\Delta C$, but in the present embodiment, the output waiting time T is made constant, and instead, the timing when the HSYNC signal becomes High is compensated by using $\Delta C$.

This operation will be described along a flowchart in FIG. 6.

The HSYNC signal compensating section 21 (hereafter, referred to simply as signal compensating section 21) obtains the output Cn+1 of the position sensor section 50 when the n+1-th line is scanned (B1). Furthermore, it reads out the output Cn of the position sensor section 50 when the n-th line is scanned, and the HSYNC shift waiting time Wnew (=Wold) when the n+1-th line is scanned. Here, the HSYNC shift waiting time is time since the compensating HSYNC signal inputted into the image output section 22 was made Low until it is made High, and it is counted by the pixel clock. Next, the signal compensating section 21 calculates $\Delta C=Cn+1-Cn$ (B3), and it calculates Wnew=Wold+$\Delta C$ as the HSYNC signal shift waiting time when scanning the n+2-th line (B4). Then, the signal compensating section 21 sets the HSYNC shift waiting time Wnew as a target value of the internal counter (B5). Furthermore, it substitutes the value of Cn+1 in Cn, and it substitutes the value of Wnew in Wold, so that it may renew the values (B6). Then, when the HSYNC signal inputted from outside has changed from High to Low (B7), it also sets the compensating HSYNC signal to be inputted into the image output section 22 to Low, and it performs the reset start of the internal counter. (B8). Consequently, in the internal counter, 1 is added in synchronization with the cycle of the pixel clock, and finally the target value Wnew is reached (B9). When the internal counter has reached the target value Wnew, the signal compensating section 21 shifts the compensating HSYNC signal to be inputted into the image output section 22 to High (B10). The image output section 22 which has detected that this compensating HSYNC signal has become High counts a fixed time T (output waiting time) from that time according to the pixel clock, and when the fixed time T has elapsed, it outputs image signals for one line corresponding to the n+2-th line (B11).

Figure 7:
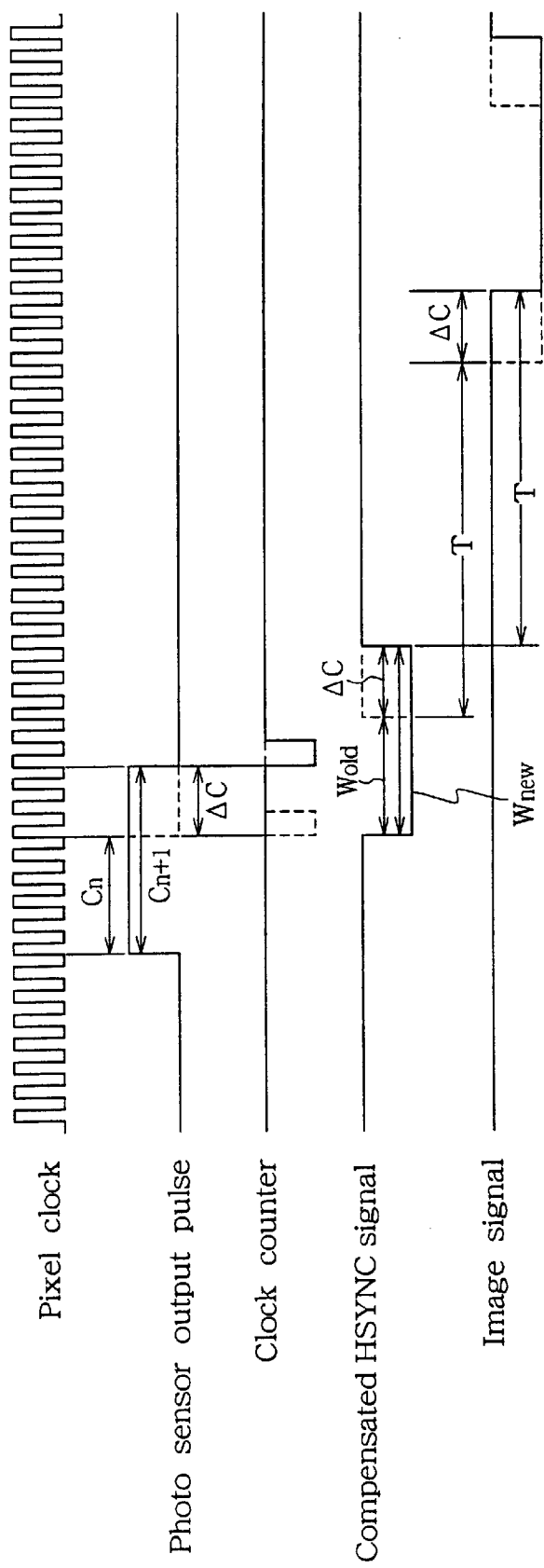
FIG. 7 is a figure of signals for describing the operation of the embodiment in FIG. 5.

Thereby, as shown in the figure of signals in FIG. 7, the timing for the compensating HSYNC signal to shift from Low to High is compensated by ΔC, so that the output timing of the image signal may be compensated by ΔC. Therefore, as a result, an operational effect similar to that in the prior embodiment can be obtained.

Figure 8:
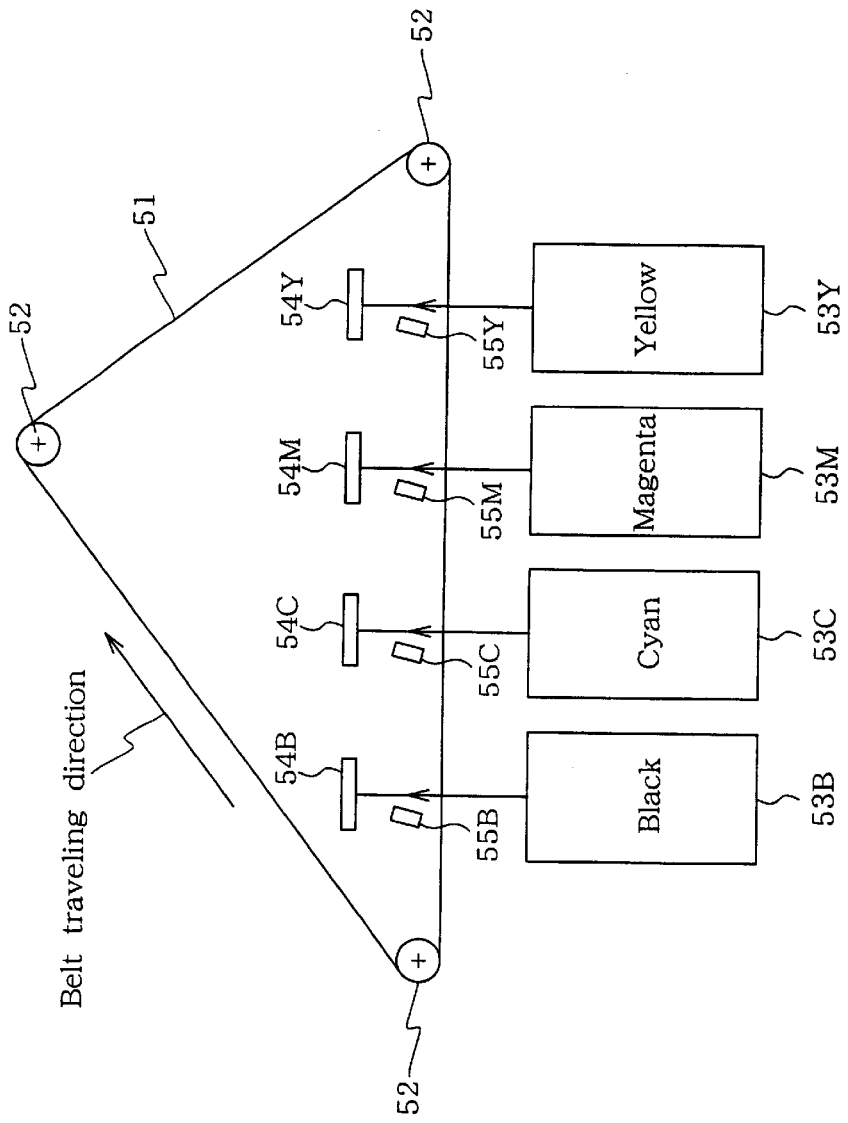
FIG. 8 is a schematic block diagram for describing still another embodiment of the present invention.

Furthermore, in the case where the present invention is applied to a color electrophotographic printer, it is also possible to provide a mask 54 and a photo sensor 55 separately for Y, M, C, and B as shown in FIG. 8 and to provide a position sensor section 50 and a position control section 1 or 2 in FIG. 1 or 5. This makes it possible to line up the forming position of an electrostatic latent image corresponding to each color in the width direction of the belt, so that printing with high accuracy can be performed.

Here, in each of the above embodiments, the compensation of one back line is performed according to scanning results of two front lines among three successive lines, but three successive lines are not necessarily required. Furthermore, in the operation of each of the above embodiments, High and Low of the signal are concretely described, but this is an exemplification, and in some cases, High and Low are replaced depending on the design.

The present invention is configured and functions as described above, and according to this, when forming an electrostatic latent image, a difference between a position of the photosensitive belt in a front line and a position of the photosensitive belt in a back line is detected, and on the basis of this difference, the output timing of an image signal when scanning a still more back line is compensated, and consequently, it is possible to compensate the forming position of an electrostatic latent image just after the detection of the position of the belt. Furthermore, a position of the photosensitive belt is not controlled, but the position of the photosensitive belt is detected by the line and just after that, the output timing of an image signal is compensated, and therefore, an electrostatic latent image can be formed with high accuracy at a correct position. Furthermore, since the output timing of the image signal is compensated by the line, an electrostatic latent image can be formed at a correct position on the belt, even in the situation where the photosensitive belt is inclined in the width direction. Therefore, it is possible to provide an excellent electrophotographic printer which has previously been never found, and by which printing output with high accuracy can be obtained especially in the composition comprising a plurality of laser output sections for a single photosensitive belt like a color printer.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-125987 (Filed on May 8$^{th}$, 1998) including specification, claims, drawings and summary are incorporated herein by reference in its entirety.

What is claimed is:

1. An electrophotographic printer comprising:
   a photosensitive belt on which an electrostatic latent image is formed;
   a laser output section which scans the photosensitive belt in a width direction to form the electrostatic latent image;
   a position sensor section which detects a position in the width direction of the photosensitive belt on the basis of time since a light spot scanned by the laser output section passes a reference point until the light spot passes an edge of the photosensitive belt;
   a position control section which controls a forming position of the electrostatic latent image on the photosensitive belt on the basis of a position of the photosensitive belt outputted from the position sensor section; and
   a printer section which develops the electrostatic latent image on a medium and outputs the electrostatic latent image,
   said position control section having a timing compensating function to compensate output timing of an image signal to be outputted when a still more back line is scanned, on the basis of a difference between a position of the photosensitive belt which is outputted from said position sensor section when a front line of the electrostatic latent image is scanned and a position of the photosensitive belt which is outputted from said position sensor section when a back line is scanned, said position control section calculating the timing compensating function for the still more back line after obtaining the position of the photosensitive belt of the back line.

2. The electrophotographic printer according to claim 1, wherein said timing compensating function is a function to compensate output timing of an image signal to be outputted when the n+2-th line is scanned, on the basis of a difference ΔC between a position Cn of the photosensitive belt outputted from said position sensor section when the n-th line(n=1, 2, 3 . . . ) is scanned and a position Cn+1 of the photosensitive belt outputted from said position sensor section when the n+1-th line is scanned.

3. The electrophotographic printer according to claim 2, wherein said timing compensating function is a function to compensate output timing of an image signal when the n+2-th line is scanned, by ΔC relative to output timing of an image signal when the n+1-th line is scanned.

4. The electrophotographic printer according to claim 3,
   wherein said position control section has a trigger function to start output of said image signal after a fixed time has elapsed since a horizontal synchronizing signal to form an electrostatic latent image changed,
   and said timing compensating function is a function to compensate a fixed time since said horizontal synchronizing signal changed until an image signal is outputted.

5. The electrophotographic printer according to claim 4,
wherein said position control section has a trigger function to start output of said image signal after a fixed time has elapsed since a horizontal synchronizing signal to form an electrostatic latent image changed, and said timing compensating function is a function to compensate timing of change of said horizontal synchronizing signal.

6. An electrophotographic printer comprising:

a photosensitive belt on which an electrostatic latent image is formed;

four pieces of laser output sections which scan the photosensitive belt in a width direction to form the electrostatic latent image and which respectively correspond to Y, M, C, and B;

a position sensor section which detects a position in the width direction of the photosensitive belt on the basis of time since a light spot scanned by the laser output sections passes a reference point until the light spot passes an edge of the photosensitive belt, for each of Y, M, C, and B;

a position control section which controls a forming position of the electrostatic latent image on the photosensitive belt on the basis of a position of the photosensitive belt outputted from the position sensor section, for each of Y, M, C, and B; and a printer section which develops the electrostatic latent image on a medium and outputs the electrostatic latent image, for each of Y, M, C, and B, said position control section having a timing compensating function to compensate output timing of an image signal to be outputted when a still more back line is scanned, on the basis of a difference between a position of the photosensitive belt which is outputted from said position sensor section when a front line of the electrostatic latent image is scanned and a position of the photosensitive belt which is outputted from said position sensor section when a back line is scanned, for each of Y, M, C, and B, said position control section calculating the timing compensating function for the still more back line after obtaining the position of the photosensitive belt of the back line.

7. The electrophotographic printer according to claim 6, wherein said timing compensating function is a function to compensate output timing of an image signal to be outputted when the n+2-th line is scanned, on the basis of a difference $\Delta C$ between a position $C_n$ of the photosensitive belt outputted from said position sensor section when the n-th line($n=1, 2, 3 \ldots$) is scanned and a position $C_{n+1}$ of the photosensitive belt outputted from said position sensor section when the n+1-th line is scanned.

8. The electrophotographic printer according to claim 7, wherein said timing compensating function is a function to compensate output timing of an image signal when the n+2-th line is scanned, by $\Delta C$ relative to output timing of an image signal when the n+1-th line is scanned.

9. The electrophotographic printer according to claim 8,
wherein said position control section has a trigger function to start output of said image signal after a fixed time has elapsed since a horizontal synchronizing signal to form an electrostatic latent image changed, and said timing compensating function is a function to compensate a fixed time since said horizontal synchronizing signal changed until an image signal is outputted.

10. The electrophotographic printer according to claim 9,
wherein said position control section has a trigger function to start output of said image signal after a fixed time has elapsed since a horizontal synchronizing signal to form an electrostatic latent image changed, and said timing compensating function is a function to compensate timing of change of said horizontal synchronizing signal.

\* \* \* \* \*